US012499951B2

(12) United States Patent
Nitzan et al.

(10) Patent No.: US 12,499,951 B2
(45) Date of Patent: Dec. 16, 2025

(54) FEATURE BASED READ THRESHOLD ESTIMATION IN NAND FLASH MEMORY

(71) Applicant: Kioxia Corporation, Tokyo (JP)

(72) Inventors: Eyal Nitzan, Haifa (IL); Avi Steiner, Haifa (IL); Hanan Weingarten, Haifa (IL)

(73) Assignee: KIOXIA CORPORATION, Tokyo (JP)

( * ) Notice: Subject to any disclaimer, the term of this patent is extended or adjusted under 35 U.S.C. 154(b) by 127 days.

(21) Appl. No.: 18/122,758

(22) Filed: Mar. 17, 2023

(65) Prior Publication Data

US 2024/0312528 A1 Sep. 19, 2024

(51) Int. Cl.
*G11C 16/26* (2006.01)
*G11C 11/54* (2006.01)
*G11C 16/34* (2006.01)

(52) U.S. Cl.
CPC .............. *G11C 16/26* (2013.01); *G11C 11/54* (2013.01); *G11C 16/349* (2013.01)

(58) Field of Classification Search
CPC ....... G11C 16/26; G11C 11/54; G11C 16/349; G11C 11/5642; G11C 16/0483
USPC ...................................................... 365/185.2
See application file for complete search history.

(56) References Cited

U.S. PATENT DOCUMENTS

| 8,751,726 | B2 | 6/2014 | Katz | |
|---|---|---|---|---|
| 11,195,585 | B2 | 12/2021 | Tokutomi et al. | |
| 2022/0293192 | A1* | 9/2022 | Berman | G06F 3/0604 |
| 2023/0036490 | A1* | 2/2023 | Wang | G11C 11/54 |
| 2024/0086101 | A1* | 3/2024 | Wang | G11C 11/5642 |

* cited by examiner

*Primary Examiner* — Amir Zarabian
*Assistant Examiner* — Minh Dinh
(74) *Attorney, Agent, or Firm* — Foley & Lardner LLP (57) ABSTRACT

A method for reading data from a solid-state drive (SSD) configured to store data in a plurality of memory cells arranged in memory blocks comprising rows, the method performed by a controller in communication with the plurality of memory cells. The method comprises retrieving data from a target row of memory cells of the plurality of memory cells associated with a read request received from a host using initial threshold voltages. The method also includes decoding the data using a hard decision stage. Additionally the method comprises estimating read threshold voltages of the target row of memory cells based on a transformation of a distribution of threshold voltages of cells in a memory block containing the target row when the hard decision decoding stage fails. The method further includes retrieving data from the target row using the estimated read threshold voltages.

20 Claims, 6 Drawing Sheets

FEATURE BASED READ THRESHOLD ESTIMATION IN NAND FLASH MEMORY

FIELD

The present disclosure relates to solid-state drives (SSD) and methods for estimating optimal threshold voltages used to read data from a memory device and to improve quality of service (QOS) of the SSD.

BACKGROUND

A solid-state drive (SSD) generally has faster performance, is more compact, and is less sensitive to vibration or physical shock than a magnetic disk drive. Given these advantages, SSDs are being used in more and more computing devices and other consumer products in lieu of or in addition to magnetic disk drives, even though the cost-per-gigabyte storage capacity of SSDs is significantly higher than that of magnetic disk drives. SSDs utilize physical memory cells that comprise non-volatile semiconductor storage devices, such as NAND memory devices, to store data. A controller of an SSD manages the transfer of data between a host and the memory cells of the SSD. Writing data to and reading data from the physical memory cells of an SSD typically involves transferring data between a host external to the SSD and the nonvolatile semiconductor storage devices.

SSDs are subject to large volumes of data traffic as they receive multiple read and write requests from the host. The wear and tear of the device results in threshold voltage shifts, leading to an increase in bit error rates of data decoded from such memories. Accordingly, there has been an increase in emphasis on minimizing the bit error rate in NAND flash memories. By minimizing the BER, the latency involved in processing a read command decreases causing the Quality of Service (QOS) of the device to improve.

SUMMARY

According to an embodiment of the present disclosure, there is provided a method for reading data from a solid-state drive (SSD) configured to store data in a plurality of memory cells arranged in memory blocks comprising rows, the method performed by a controller in communication with the plurality of memory cells. The method comprises retrieving data from a target row of memory cells of the plurality of memory cells associated with a read request received from a host using initial threshold voltages. The method also includes decoding the data using a hard decision stage. Additionally the method comprises estimating mock threshold voltages of the target row of memory cells based on a transformation G of a distribution of threshold voltages of cells in a memory block containing the target row when the hard decision decoding stage fails. The method further includes retrieving data from the target row using the estimated mock threshold voltages.

According to another embodiment of the present disclosure, there is provided a solid-state drive (SSD) comprising a non-volatile semiconductor memory device comprising a plurality of memory cells for storing data, the memory cells arranged in memory blocks comprising rows, and a controller in communication with the plurality of memory cells. The controller is configured to retrieve data from a target row of memory cells of the plurality of memory cells associated with a read request received from a host using initial threshold voltages. The controller is also configured to decode the data using a hard decision stage. Additionally, the controller is configured to estimate mock threshold voltages of the target row of memory cells based on a transformation G of a distribution of threshold voltages of cells in a memory block containing the target row when the hard decision decoding stage fails. Further, the controller is configured to retrieve data from the target row using the estimated mock threshold voltages.

In some implementations, the distribution of threshold voltages may comprise a histogram H having a plurality of features. In certain implementations, the transformation G may be applied to the plurality of features of H. In further implementations, the transformation G may be nonlinear. In some implementations, the transformation G may comprise at least one of: roots of H, powers of H, natural logarithm of H, and products between the features in H. In certain implementations, a number of features of G used in the estimation may be limited to a predetermined number. In further implementations, the features of G selected for use in the estimation may be based on hardware or memory cell constraints of the SSD. In some implementations, the mock threshold voltages may be estimated using an estimator coefficient Y. In certain implementations, Y may be obtained using an iterative weighted least squares algorithm, weights of the least squares algorithm being a function of a bit error rate (BER) added per row. In further implementations, the read threshold voltages may be estimated using a deep-neural network (DNN).

BRIEF DESCRIPTION OF DRAWINGS

The foregoing and other objects and advantages will be apparent upon consideration of the following detailed description, taken in conjunction with the accompanying drawings, in which like reference characters refer to like parts throughout, and in which.

DETAILED DESCRIPTION

To provide an overall understanding of the devices described herein, certain illustrative embodiments will be described. Although the embodiments and features described herein are specifically described for use in connection with an SSD having a controller, it will be understood that all the components and other features outlined below may be combined with one another in any suitable manner and may be adapted and applied to other types of SSD architectures with memories having a similar need for optimized estimation of read threshold voltages for an improved Quality of Service (QOS).

High read threshold estimation accuracy is crucial in current and future NAND devices for reducing read flow latency and improving quality of service (QOS). The read flow is roughly divided into hard bit/decision (HB) decoding stages followed by soft bit/decision (SB) decoding stages if the HB stages fail. The SB decoding requires a large number of READ operations and may induce high latency. Therefore, high HB decoding success rate is crucial for QoS. Hard decision decoding or hard bit decoding, as are used interchangeably herein, refers to an error correction mechanism which reads bits or a block of bits, and decodes each bit by considering it as definitely '1' or '0'. A hard decision decoding stage of a read flow samples the received pulses representing bits and compares their voltages to threshold values. If a voltage is greater than the threshold value, it is decoded as '1' and otherwise decoded as '0'. Soft decision decoding or soft bit decoding, as are used interchangeably herein, refers to a class of algorithms that takes bits or a block of bits and decodes them by considering a range of possible values that it may take. It considers the reliability of each received pulse to form better estimates of input data.

In current read flow, a quick training (QT) algorithm is deployed after initial hard bit (HB) decoding failure. This decoding is performed after READ with default thresholds or history table (HT) thresholds. The QT generates estimated read thresholds and then, another HB decoding attempt is applied. If this second decoding attempt fails, the read flow continues to SB stage inducing significant latency. Thus, improving the accuracy of QT algorithm can increase the HB stage success rate and reduce the number of times SB stage is activated. For simplicity, inter-cell interference (ICI) compensation has not been considered in this disclosure, although ICI compensation can also improve HB stage success rate, as described in U.S. patent application Ser. No. 18/123,232 entitled "Bit Error Rate Estimation and Classification in NAND Flash Memory," filed on Mar. 17, 2023, the contents of which are hereby incorporated herein in entirety.

Current QT uses a mock histogram of thresholds as input features and finds a linear fit to read thresholds. However, the mathematical connection between mock histogram values and read thresholds may be nonlinear. According to embodiments of the present disclosure, feature processing is used to create nonlinear transformations of mock histogram values. The nonlinear transformations can be used to better fit the connection between mock histogram values and read thresholds and consequently improve QT read thresholds estimation accuracy and reduce BER.

Embodiments of the present disclosure provide a method for improving QT read thresholds estimation accuracy. This is achieved by applying mock reads of a target row. The method then determines a histogram using all mock results as basic input features for read threshold estimation. The method also involves feature processing in which nonlinear transformations of the basic mock histogram features are determined and combined into a single generalized histogram of features, where each column of the histogram represents a different feature. A linear QT estimator or a deep-neural network (DNN) QT is used for estimation of the optimal read thresholds given the processed features.

The feature processing method of the present disclosure can be easily integrated into the read flow during QT stage and requires only simple digital signal processing operations. The method is also scalable in terms of memory requirements, where additional memory may be required for coefficient matrices and/or weights and biases of a neural network. This increases the QT estimation capability using the processed features and consequently increasing HB stage success rate and overall QoS. The QT with processed features is trained by generation of a database from voltage-threshold.scans (VT-scans) on NAND devices under the required stress conditions. QT with processed features requires no additional reads on top of those reads done for thresholds estimation.

The present disclosure also provides methods for obtaining higher QoS in a NAND memory device by optimizing the estimated thresholds used for reading data. This is achieved by relying on a threshold voltage distribution across the memory cells of the device for estimating optimized mock thresholds to improve the read from the device with minimum BER. Analysis of threshold voltage distribution across the memory cells of a flash device by using a Quick Training (QT) method and mock threshold histograms (collated in histogram bins) have been described in detail in U.S. Pat. No. 8,751,726 issued on Jun. 10, 2014 entitled "System and Methods Employing Mock Thresholds to Generate Actual Reading Thresholds in Flash Memory Devices," and U.S. Pat. No. 11,195,585 issued on Dec. 7, 2021 entitled "Calculating Shift Amounts for Read Voltage Correction," the contents of which are hereby incorporated herein in entirety.

QT involves the mock reading of data that is obtained during processing of a read command, e.g. a read flow, for estimating threshold voltages at a current stage of processing the read command. The mock reads are reads at fixed predetermined thresholds, termed 'mocks' that are chosen based on offline optimization and database training. According to embodiments of the present disclosure, processing mock reading data features prior to QT read thresholds estimation improves estimation accuracy and consequently improves hard decision decoding performance and QoS of the memory device. Data and/or signal processing operations may be implemented on a NAND memory controller hardware and/or firmware, which lends itself to low complexity processing.

Figure 1:
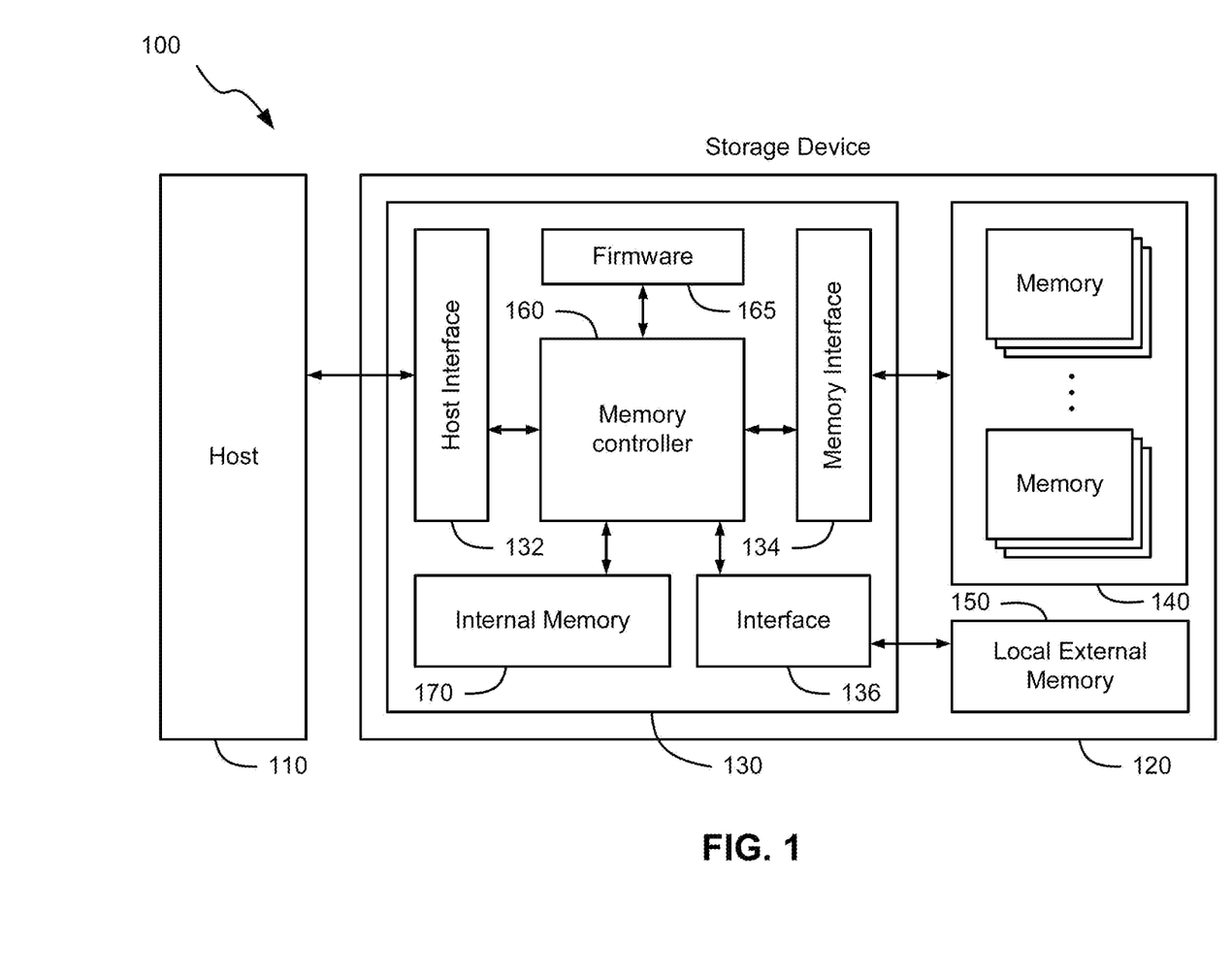
FIG. 1 illustrates a schematic representation of an SSD, configured according to one or more embodiments of the present disclosure.

FIG. 1 is a block diagram of a memory system 100 comprising at least one host 110 in communication with a storage device 120. The host 110 is a computing system that comprises processors, memories, and other components as is generally known in the art, and which is not shown in FIG. 1 for the sake of brevity. Storage device 120 provides non-volatile storage functionality for use by the host 110. Storage device 120 may include an integrated circuit comprising a controller communicatively coupled to a memory such as an SSD or HDD. Such an integrated circuit may comprise a system-on-chip (SoC) 130. SoCs are advantageous as they provide a single integrated circuit that contains circuitry and components of the electronic system for the storage device 120 to function. SoC 130 may be communicatively coupled to a memory 140. Memory 140 may comprise SSD or HDD. In the case of memory 140 comprising an SSD, the memory 140 may additionally comprise a NAND semiconductor memory, such as a NAND based flash memory device. The memory 140 may be organized into pages, blocks, planes, die and chips. Memory 140 may comprise a plurality of NAND chips, such as, for example, 32, 64, 128, 256 separate NAND chips, and each NAND chip can be running separate commands on individual die (not shown) within the chip.

Storage device 120 may include a local memory external to the SoC 130, such as a dynamic random access memory ("DRAM") 150. Local external memory 150 comprises several buffers used to buffer data during read and write operations between the host 110 and the memory 140. Further, storage device 120 may comprise a host interface 132 which enables communication with the host 110 for the receipt of I/O commands and Vendor Unique Commands (VUCs). Storage device 120 may also include a memory interface 134 for communication with the memory 140 (through a plurality of channels, not shown), and an interface 136 for communication with the local external memory 150. Interface 132, on the SoC 130 may comprise a Serial Advanced Technology Attachment (SATA) connector or a NVMe™ connector (NVMe™ is an acronym for "NVM express," where "NVM" stands for "nonvolatile memory") operating with a PCIe™ ("Peripheral Component Interface Express") bus, for example. Interface 134 may comprise an Open NAND Flash Interface (ONFI) or a manufacturer's proprietary interface, for example. Interface 136 may comprise, for example, an interface according to, but not limited to: a Double Data Rate (DDR) memory bus standard such as DDR3, DDR4 or DDR5; a Low Power Double Data rate (LPDDR) memory bus standard such as LPDDR3, LPDDR4 or LPDDR5; a Hybrid Memory Cube (HMC) memory bus standard.

Also shown in FIG. 1 is a memory controller 160 that enables the storage device 120 to perform various functions such as processing VUC commands received from the host 110 as well as internal commands generated within the storage device 120 to maintain functionality (e.g. NVMe™ commands such as 'FormatNVM'). The storage device 120 also includes a Read-Only Memory (ROM) that stores firmware 165 for the operation of various states of the storage device 120. The firmware 165 comprises computer executable instructions that are executed by the controller 160 for operation of the storage device 120. The ROM is programmed with the firmware 165 during manufacture of the storage device 120 and may be re-programmed by the controller 160 as necessary. This allows the operation of the storage device 120 to be adapted as needed. The storage device 120 may also include an internal memory 170, such as a static random access memory ("SRAM"), that forms part of the same integrated circuit as the SoC 130. The internal memory 170 may be configured to store data such system metadata, mapping tables and bad block lists. In some embodiments, such data may also be stored in the local external memory 150.

Memory controller 160 may also comprise an error correction encoder and decoder. The decoder may comprise an Encryption and Error Correction Code (ECC) decoder communicatively coupled to a hard-decision decoder (alternatively referred to herein as a hard bit (HB) decoder) and a soft-decision decoder (alternatively referred to herein as a soft bit (SB) decoder). The ECC decoder may also include a BCH error corrector or any other cyclic error corrector. Data to be written to the memory 140 is encoded with an ECC code in a first instance to give ECC-encoded data. To decode data from the memory 140, data from a target row of memory cells is passed through the hard-decision decoder, and, if required, the soft-decision decoder. Additionally, wear and tear of the device during its lifespan result in errors being introduced to the data when the data is read out from the memory device.

Figure 2:
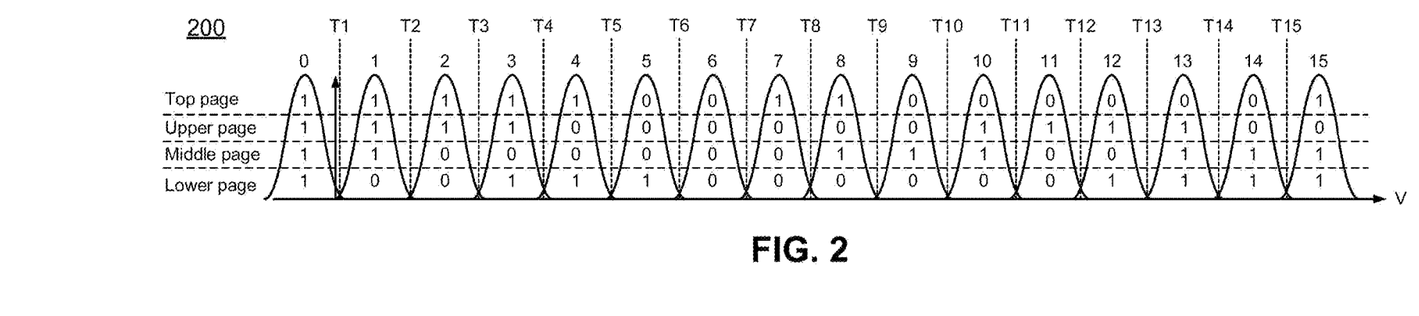
FIG. 2 illustrates exemplary threshold voltage distributions across the pages of a quadruple-layer cell (QLC) of a memory device.

FIG. 2 shows a threshold voltage distribution of an exemplary quadruple-level cell (QLC) of a flash memory device. QLCs store four bits per cell to describe 24 states per cell stored in four (lower, middle, upper and top) pages. The threshold voltage distribution for each of the sixteen states of the QLC is shown in the sixteen lobes 0-15 of FIG. 2. Reading from the various pages of the QLC requires using various threshold voltages. For example, a lower page read requires using thresholds T1, T3, T6 and T12, a middle page read requires using thresholds T2, T8, T11 and T13, an upper page read requires using thresholds T4, T10 and T14, and a top page read requires thresholds T5, T7, T9 and T15. In most instances, the lower most lobe 0 is known as the erase level. While FIG. 2 illustrates the voltage distribution of a QLC, other cell architectures may also be used in a flash memory device. These include but are not limited to single-level cells (SLC) which stores one bit per cell, multi-level cells (MLC) which stores two bits per cell, and triple-level cells (TLC) which stores three bits per cell.

Notwithstanding, an error in reading from the lobes occurs when two neighboring lobes overlap or intersect. This is typically characterized by a bit error rate (BER). Knowing the optimal threshold of a target row in a NAND device before performing a read operation is important to minimizing the bit error rate (BER) of the target row, and can be very useful for determining if a subsequent operation (e.g. decoding) will succeed or fail. However, the optimal threshold of a target row is not known during NAND device operation as device operation and history would have shifted thresholds from their initial factory values or from the values written to the controller firmware.

Retention, program/erase (P/E) cycles and read disturb can change the voltage threshold distribution in different ways, as can be seen by the variation in T0-T15 in FIG. 2. For each condition, different read thresholds may be chosen to achieve the lowest BER after a READ operation. Thus, the read thresholds of a target page in the NAND device may be estimated repeatedly during the device life cycle in order to maintain high read performance and benefit from an efficient read flow with low latency that avoids soft bit (SB) decoding as much as possible.

Figure 3:
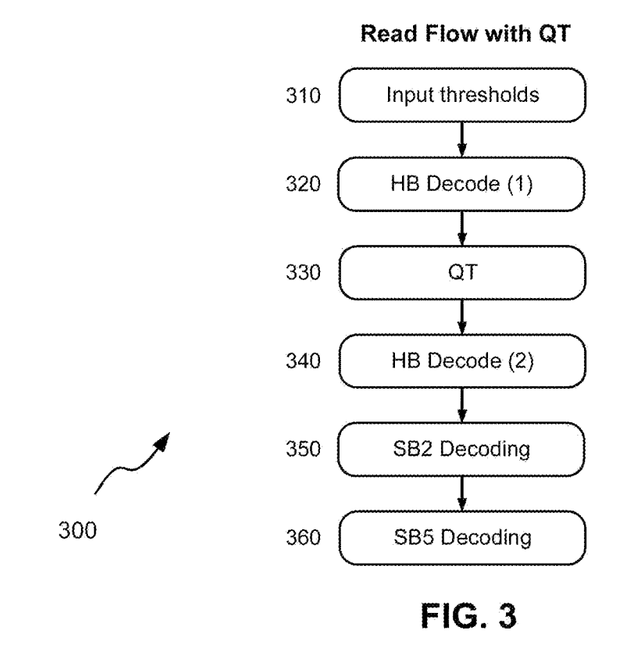
FIG. 3 illustrates a read flow implemented with QT.

FIG. 3 illustrates a read flow 300 performed by the controller, according to an embodiment of the present disclosure. In one implementation, the read flow 300 uses the QT algorithm described above, and includes the following stages. Stage 310: Retrieve input thresholds for target row stored in controller. These input thresholds may be default factory settings written in the device firmware, or obtained from a history table stored in the controller. The input thresholds are then used for a page READ. Stage 320: A first hard bit (HB) or hard decision decoding is then performed on the read data. Stage 330: If the previous HB decoding stage fails, apply QT to obtain new thresholds, and page READ. Stage 340: A second HB decoding is performed. Stage 350: If the previous HB decoding stage fails, a soft decision or soft bit (SB) decoding stage with 2-bit information (SB2) is performed. Stage 350: If the previous SB stage fails, a SB decoding stage with 5-bit information (SB5) is performed.

From read flow 300, it can be seen that the QT threshold estimation capability at stage 330 is very important for maintaining HB decoding success (e.g. non-failure) at stage 340, thereby avoiding SB decoding operations that have high latency. A QT algorithm uses mock reads histogram of a target row in a device and applies a linear estimator trained offline on a database for estimation of the optimal read thresholds. Such estimation takes into account the different conditions of the flash device and uses the mock histogram as input features for estimating the optimal read thresholds using a linear estimator. However, the relationship between mock histogram features and read thresholds may be nonlinear.

According to an embodiment of the present disclosure, feature processing is proposed to create nonlinear transformations of the mock histogram features. This facilitates the optimization of an optimal linear coefficient matrix that linearly combines the processed features into read thresholds. In this way, nonlinear connection between mock histogram features and read thresholds can be found, and better estimation accuracy of read thresholds can be obtained. As mentioned above, better estimation of the read thresholds will reduce the BER during READ operations and increase the success rate of the second HB decoding attempt in stage 340 of FIG. 3, thereby avoiding the need for using a SB decoding stage. Statistical operations may be performed to process the mock histogram features and create better read thresholds estimators. The proposed methods of the present disclosure are suitable for any generation of NAND devices and do not depend on the NAND flash storage density. The following sections describe various embodiments with respect to a QLC setup, however, it will be understood that embodiments of the present disclosure extend to any configuration and/or storage density of memory cells, such as SLC, MLC, and TLC, for example.

QT with feature processing.

Figure 4A:
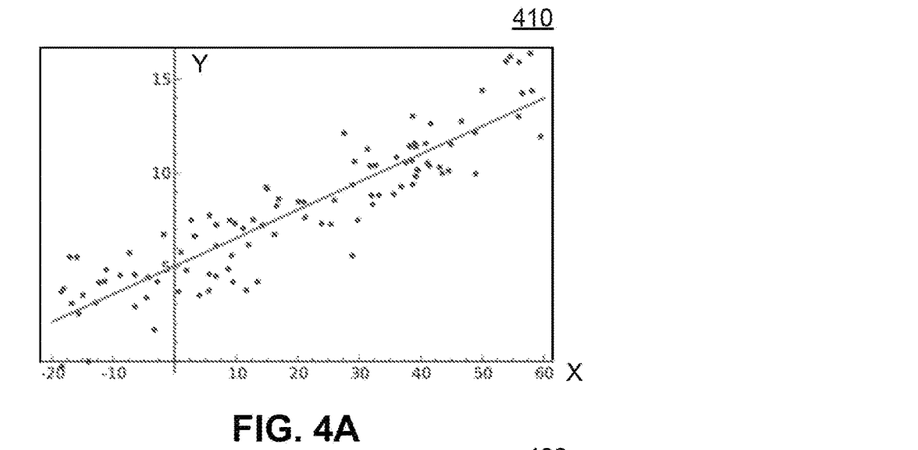
FIG. 4A illustrates an exemplary linear regression fit to data.

A method to estimate the read thresholds of a target row uses a linear combination of the distribution of threshold voltages such as mock histogram data (mock histogram bins), as reference above. For the four pages of a QLC NAND device, the estimation $\hat{V}_{15 \times 1}$ of the 15 QLC read thresholds is:

$$\hat{V}_{15 \times 1} = X_{15 \times 16} \cdot H_{16 \times 1}$$

where $H_{16 \times 1}$ is the histogram threshold values obtained from mock reads (it has 16 values), and $X_{15 \times 16}$ is the linear estimator coefficients matrix, trained offline on a database and saved by the NAND controller. Throughout this disclosure, the values of the histogram may also be referenced as elements or features. The coefficient matrix $X_{15 \times 16}$, may be determined using a simple linear regression 410, as exemplified in FIG. 4A.

According to an embodiment of the present disclosure, a more advanced estimator is proposed that processes the mock histogram features and creates nonlinear transformations of the mock histogram as additional features. Let $G_{M \times 1}$ denote a vector of linear and nonlinear transformations of the mock histogram $H_{16 \times 1}$, creating a generalized mock histogram. For example, we can use $$G = \begin{bmatrix} H \\ \vdots \\ H^N \end{bmatrix}_{16N \times 1},$$

Figure 4B:
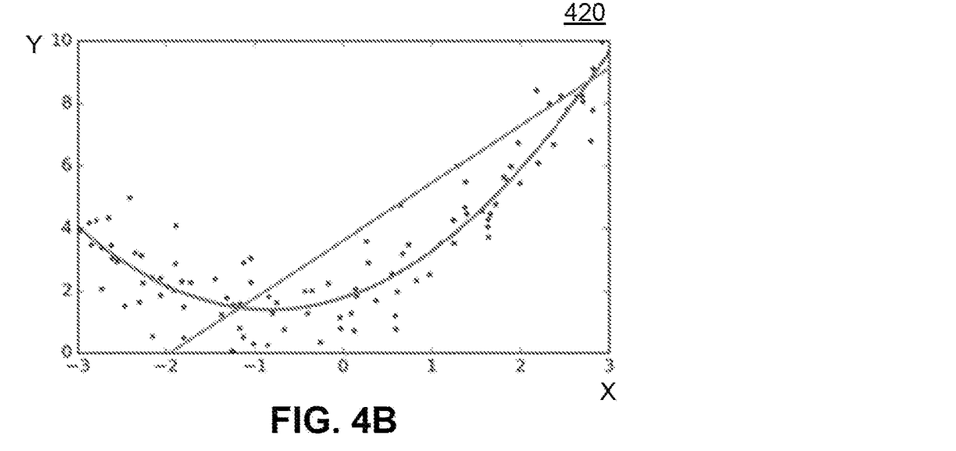
FIG. 4B illustrates an exemplary nonlinear fit to data in comparison to the linear fit of FIG. 4A.

M=16N, that includes different powers of H, where the powers are applied elementwise. Other examples to form G include the use of roots of different orders of the elements in H, natural logarithm of the elements in H, and products between the elements of H up to a certain order. Order 2 in this case means a product of each pair of elements of H, where a pair may include the same element twice. Then, for the 15 thresholds, we obtain the following estimator $$\hat{V}_{15 \times 1} = Y_{15 \times M} \cdot G_{M \times 1},$$

where $\hat{V}_{15 \times 1}$ is the estimation results of 15 QLC thresholds, $G_{M \times 1}$ is the vector of linear and nonlinear transformations of the histogram values H obtained from mock reads, and $Y_{15 \times M}$ is the linear estimator coefficients matrix, trained offline on a database. The coefficient matrix $Y_{15 \times M}$ can be obtained using a simple linear regression, such as that shown in FIG. 4A. Estimation performance using G may improve compared to using H since the relation between the mock histogram values and the optimal thresholds may be nonlinear. For example, in some cases a polynomial fit between the mock histogram values and the optimal thresholds is more appropriate than a linear fit as used by QT. The polynomial fit can be implemented by using G but not by using H. The advantage of a polynomial fit compared to linear fit to data that behaves in a nonlinear fashion is demonstrated in FIG. 4B.

According an embodiment of the present disclosure, an algorithm for a flexible optimization of the choice of the linear estimator coefficients matrix Y is proposed. A direct method to obtain Y is to use the least squares method minimizing the threshold estimator mean squared error for the linear fit. However, for optimal read threshold estimation, the metric of interest is a function of the threshold BER. For example, it may be desired to minimize the mean power 6 or 7 of the estimated threshold added BER rather than threshold estimator mean squared error compared to the optimal threshold. This aids in avoiding outliers with exceptionally high added BER rather than simply the mean performance. To that end, an iterative weighted least squares algorithm, similar to the algorithm used in current linear QT, is proposed. A least squares algorithm is one used to find the best-fitting curve to a given set of points by minimizing the sum of the square of the offsets of the points from a curve.

Here, the weights of the algorithm are initialized to equal values, and normalized such that their sum is one. A weighted least squares algorithm is then iteratively applied to choose Y for each estimated threshold where the weights are some function of the estimated threshold added BER per row in the database. For example, the second power of the current estimated threshold added BER can be used as weights per database row for a subsequent iteration. After each iteration the performance under a chosen metric is measured, e.g. mean power 6 of added BER, and if there is improvement compared to a previous iteration, the current linear estimator coefficients matrix Y is saved. The maximum number of iterations is a hyperparameter of the optimization. If the weights do not change between iterations the optimization stops. Alternatively, the optimization of Y is stopped once we reach the maximum number of iterations. Finally, the saved linear estimator coefficients matrix Y from the iteration where the best performance in terms of the chosen metric was obtained is used to estimate the thresholds.

The processing of the nonlinear features is usually implemented systematically. For example, let $$G = \begin{bmatrix} H \\ C \end{bmatrix},$$

where H is a 16×1 matrix and C contains the products between the elements of H up to order 2, which means a product of each pair of elements of H. A pair of elements may include the same element twice. Therefore, C is a 136×1 vector and the overall generalized mock histogram G is a 152×1 vector. Assume, for example, that the number of possible features (elements) to use in terms of the memory requirement is 80. The number of features in G therefore needs to be reduced to meet the memory requirements. Consequently feature selection is required in order to choose the most dominant features in G that reduce performance degradation as much as possible compared to using the entire vector G.

Feature selection.

According to a further embodiment of the present disclosure feature selection is proposed in order to meet hardware or memory constraints and to reduce computation time. Here the most dominant features in G are selected to maintain the performance degradation of the selected metric as low as possible. The coefficient matrix Y may be trained with a very large number of features and then feature selection methods can be applied to reduce Y to an acceptable size in terms of hardware and/or memory constraints. Feature selection may be implemented for example by replacing each feature with random white noise and evaluating the amount of performance degradation in terms of a chosen metric. If performance degrades significantly, it means the feature is important. Alternatively, each feature can be shuffled instead of being replaced with white noise so that the feature distribution is maintained.

Generally, feature selection methods fall into three main groups: (1) Filter based: eliminate features based on a chosen metric where features with highest scores remain, while others are eliminated; (2) Wrapper based: feature selection is implemented as a search problem such as recursive feature elimination; (3) Embedded methods: algorithms that have built in feature elimination such as Lasso. The appropriate feature selection method can be chosen based on the given application.

Figure 4C:
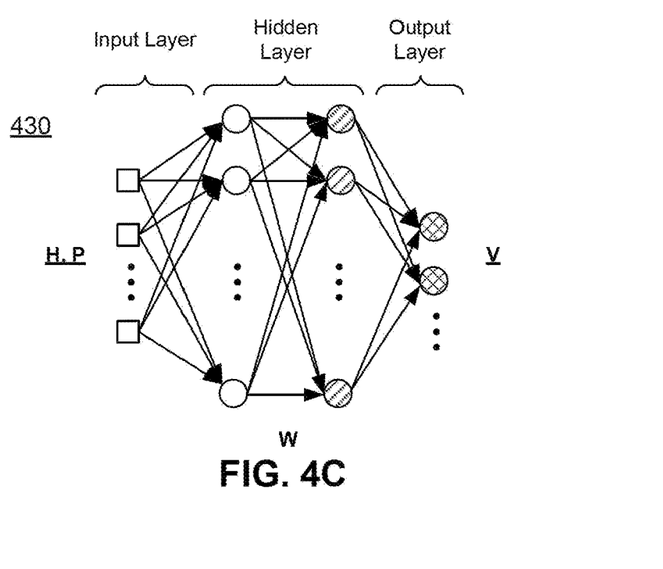
FIG. 4C illustrates an exemplary multilayer-perceptron deep neural network (DNN) with the use of features to fit data.

In a further embodiment of the present disclosure, the estimated 15 QLC thresholds $\hat{V}_{15 \times 1}$ can be obtained from a deep-neural network (DNN), as depicted in FIG. 4C which shows a multi-layer perceptron (MLP) DNN. The MLP can be used to accurately estimate the read thresholds using some input features. According to another embodiment of the present disclosure, the DNN input features can be the computed histogram H from the mock reads and the processed nonlinear transformations G. Although the DNN itself can be used to determine a nonlinear fit between the mock histogram values and the read thresholds, the processed nonlinear transformations may assist in reducing the depth of the DNN, for example, as the processed nonlinear transformations create a richer set of input features to the DNN. Reduced depth of the DNN also leads to quicker processing by the controller. The DNN estimation improves when more processed features are added to the input. The input features to the DNN may be G the generalized mock histogram vector that may include various nonlinear transformations of the original histogram values, and P additional features, e.g. physical row number, program/erase cycle count, read disturb count, mock thresholds, etc. The vector P may contain all these features, or only some of them, as they may be available information for the controller during a read operation.

Numerical Results

Figure 5:
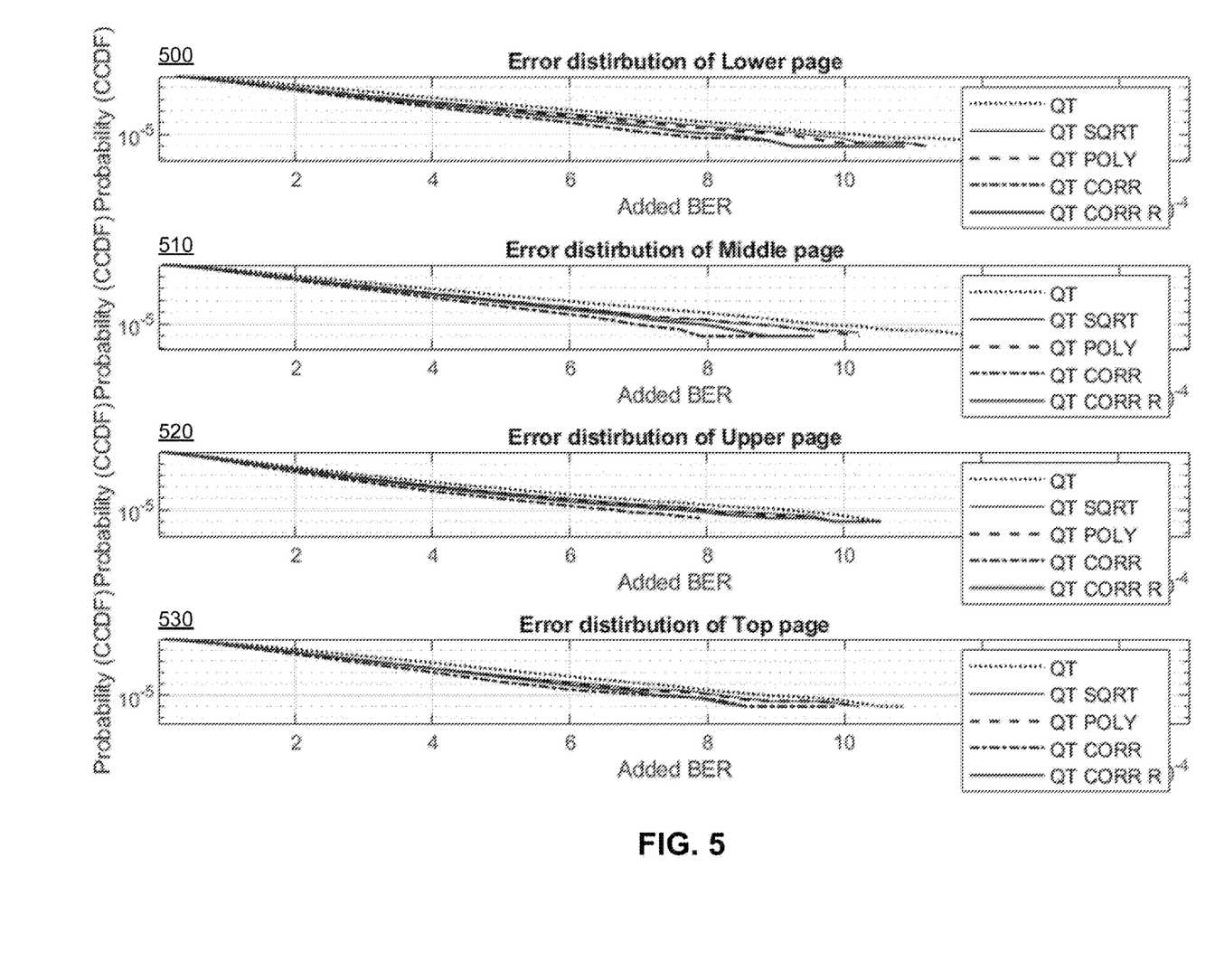
FIG. 5 illustrates the effect of various feature processing methods on read thresholds estimation accuracy measured using a complementary cumulative distribution function (CCDF) of added BER, according to one or more embodiments of the present disclosure.

FIG. 5 shows the complementary cumulative distribution functions (CCDFs) of QT in plots 500-530 obtained with different feature processing methods for each page of the QLC setup, shown as a function of added BER. The results are evaluated on a database of threshold voltage scans from flash devices under various stress conditions. The conventional linear QT performance is depicted by the dotted line. In FIG. 5, QT SQRT (solid line) represents feature processing using generalized mock histogram $G=[H^T, (H^T)^{1/3}, (H^T)^{1/2}, H, (H^T)^2, (H^T)^3]^T$ that contains roots and powers of the mock histogram H with 80 features. QT POLY (dashed line) represents feature processing using generalized mock histogram $G=[H^T, (H^T)^2, (H^T)^3, (H^T)^4, (H^T)^5]^T$ that contains powers of the mock histogram H with 80 features. QT CORR (dash-dot line) represents feature processing using generalized mock histogram $$G = \begin{bmatrix} H \\ C \end{bmatrix},$$

where H is the mock histogram and C contains the products between the elements of H up to order 2, which means a product of each pair of elements of H. A pair of elements may include the same element twice. Therefore, C is a 136×1 vector and the overall generalized mock histogram G includes 152 features. QT CORR R (thick solid line) represents feature processing using QT CORR with a reduced number of features from 152 to 80.

The chosen features are obtained by replacing each feature in C with random white noise and evaluating the amount of performance degradation in terms of a chosen metric. The 136 features are ranked and 64 are chosen to obtain $$G = \begin{bmatrix} H \\ C_R \end{bmatrix}$$

where $C_R$ includes the 64 most dominant features from C according to the chosen metric. FIG. 5 shows that the feature processing methods reduce the added BER compared to current QT. The QT CORR feature processing method yields the best results. The second best results are obtained by QT CORR R that outperforms QT POLY and QT SQRT, where all three methods contain 80 features.

Figure 6:
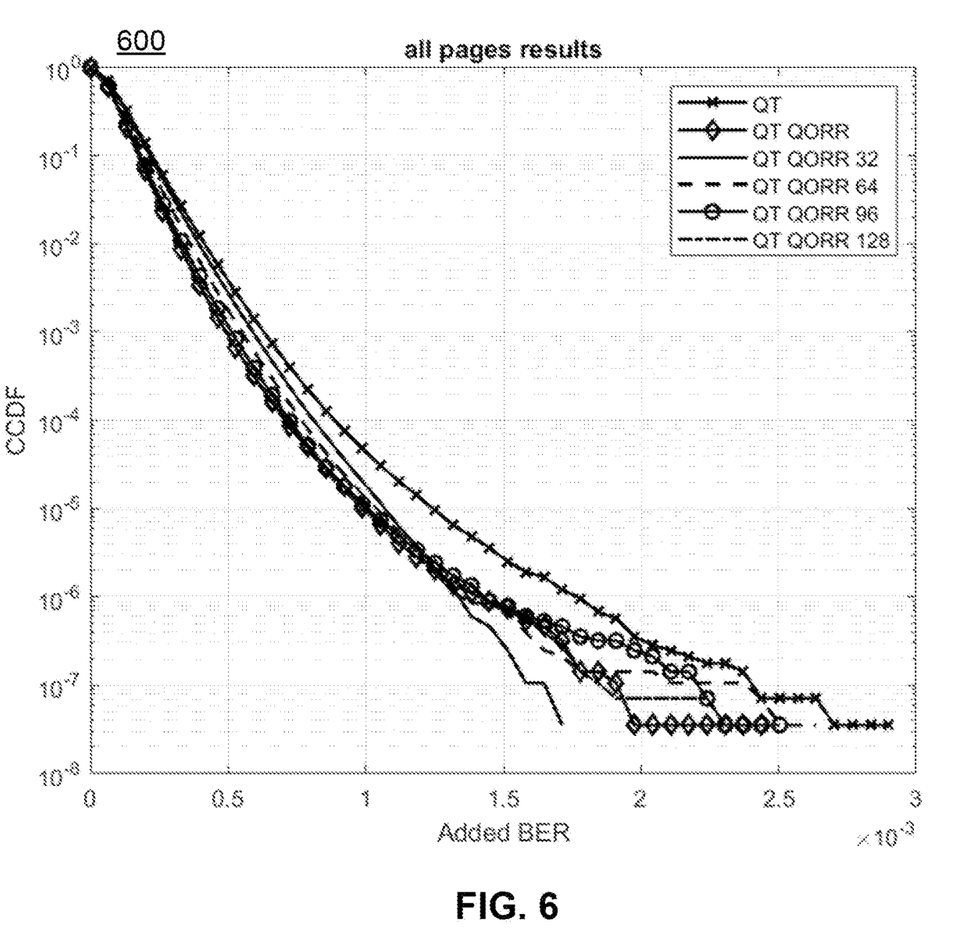
FIG. 6 illustrates the effect of the number of features used in estimating the threshold voltage on the variation of the added BER CCDF, according to one or more embodiments of the present disclosure.

According to a further embodiment of the present disclosure, the cross validation results of feature processing using QT, QT CORR, and QT CORR K that chooses K features from the overall 152 features, where K=32, 64, 96, 128, are compared in FIG. 6. More specifically, the feature processing in FIG. 6 selects K-16 features from the 136 additional correlation features. The 16 mock histogram H features for QLC are always selected. The feature selection method used is an iterative permutation feature importance (PFI). The PFI is defined to be the decrease in a model score when a single feature value is randomly shuffled. This procedure breaks the relationship between the feature and the target, thus the drop in the model score is indicative of how much the model depends on the feature. Specifically, in this example, the PFI is performed iteratively, where after each iteration the eight least significant features are removed. The significance is measured according to BER degradation, where small BER degradation given a shuffled feature means that the feature is less significant. The added BER CCDF results are shown in FIG. 6. Generally, it can be seen that the QT CORR methods improve the added BER compared to the conventional QT. Additionally, FIG. 6 shows that as the number of features increases the performance in the low to mid BER regions improves (see the mid BER area indicated by the ellipse). As for the tail behavior, QT CORR 32 has the shortest added BER tail, which shows that a large number of additional features may be prone to overfitting in some cases.

Figure 7:
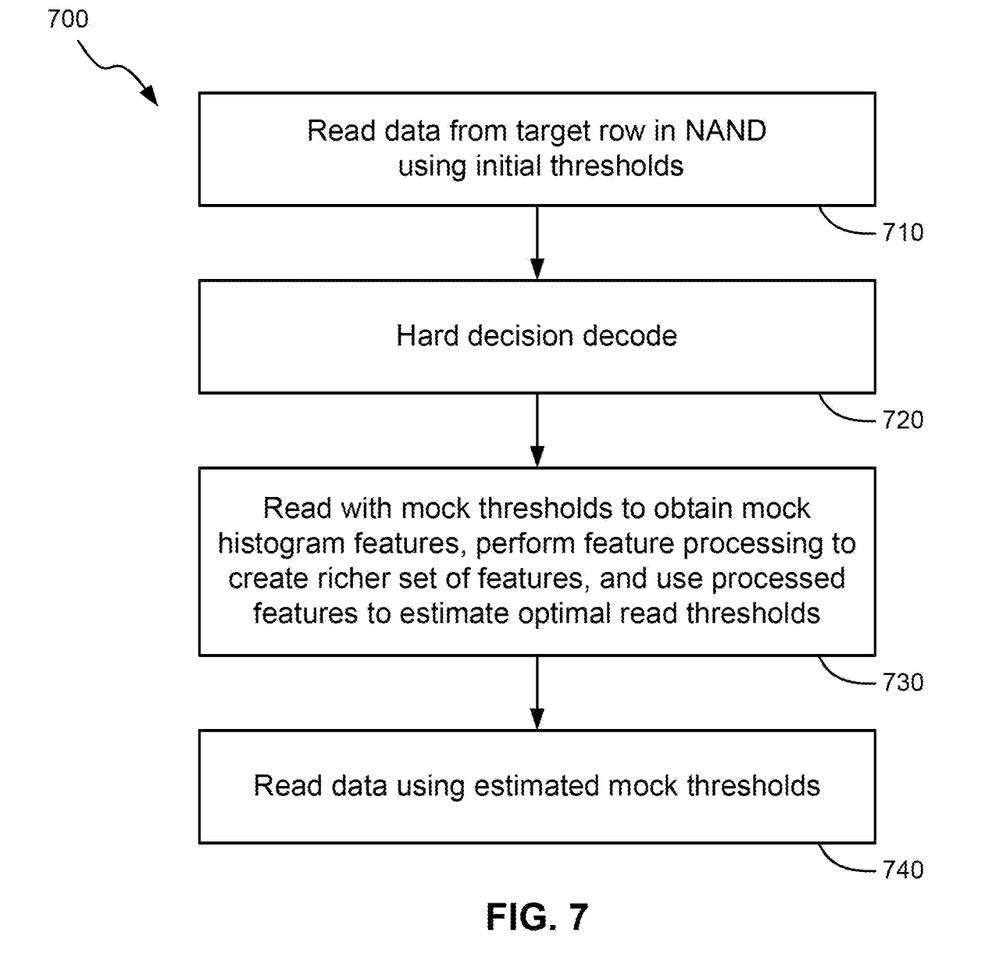
FIG. 7 is a flow diagram of a method for estimating the read threshold voltages for use in the read flow of FIG. 3, according to one or more embodiments of the present disclosure.

FIG. 7 illustrates an exemplary flow diagram of a method 700 for reading data from a flash memory using threshold voltage estimation with feature selection, according to an embodiment of the present disclosure. Method 700 is reflective of the read flow 300 shown in FIG. 3. Method 700 may be carried out by the controller 160 of the SSD 120, as described in the foregoing. Method 700 begins at step 710 where the controller reads data from a target row in the NAND memory specified in a read command received from a host. The read command is executed using initial thresholds that may be default factory settings written in the device firmware, or obtained from a history table stored in the controller. Step 710 is based on stage 310 of read flow 300. The controller then performs hard bit or hard decision decoding on the read data (step 720), based on stage 320 of read flow 300. The method then progresses to step 730 where the optimal read thresholds are estimated if the previous hard bit decoding fails. As described in the foregoing, a transformation based on the features of the threshold voltage mock histograms of the target row is used to estimate read threshold voltages where the controller reads with mock thresholds to obtain mock histogram features, the controller then performs feature processing to create a richer set of features, and the controller then uses the processed features to estimate optimal thresholds. The estimated optimal thresholds are then used to read data in step 740. The controller then performs hard bit or hard decision decoding on the read data. Based on the aforementioned embodiments of the present disclosure, the hard decision decoding following step 740 may succeed without failure in view of the estimated read thresholds to facilitate read out of the data as requested by the host. Notwithstanding, if the hard decision decoding step 740 fails, soft decision decoding as in stages 350-360 in FIG. 3 are used to read the data from the memory.

In the foregoing, all recitation of "layer" and "engine" should be taken to mean a plurality of circuits within the controller that facilitates the function as described. Such circuits may comprise electronic components formed on a semiconductor chip, such as, for example, transistors and resistors. It should be noted that the term "about" or "approximately" in the foregoing indicates a range of +20% of the stated value. Additionally, in the foregoing, all recitation of "command," "action" or "function" should be taken to be based on algorithms and instructions stored on a non-transitory computer-readable medium, that, when executed by a processor, causes a controller of an integrated circuit of a solid-stated drive (SSD) to perform the command, action or function. All recitation of "device," "memory," and "dies" are used interchangeably when used in relation to the NAND non-volatile semiconductor memory device. Further, all recitation of "hard bit" decoding is synonymous with hard decision decoding. All recitation of "soft bit" decoding is synonymous with soft decision decoding. "Thresholds" and "threshold voltages" are used interchangeably in this disclosure and mean the same thing.

Other objects, advantages and embodiments of the various aspects of the present invention will be apparent to those who are skilled in the field of the invention and are within the scope of the description and the accompanying drawings. For example, but without limitation, structural or functional elements might be rearranged consistent with the present invention. Similarly, principles according to the present invention could be applied to other examples, which, even if not specifically described here in detail, would nevertheless be within the scope of the present invention.

The invention claimed is:

1. A method for reading data from a solid-state drive (SSD) configured to store data in a plurality of memory cells arranged in memory blocks comprising rows, the method performed by a controller in communication with the plurality of memory cells, the method comprising:
retrieving data from a target row of memory cells of the plurality of memory cells associated with a read request received from a host using initial threshold voltages;
decoding the data using a hard decision stage;
if the hard decision stage fails:
performing mock reads on the target row of memory cells;
estimating optimal threshold voltages of the target row of memory cells based on a transformation G of a distribution of threshold voltages obtained from the mock reads; and
retrieving data from the target row using the estimated optimal threshold voltages.

2. The method of claim 1, wherein the distribution of threshold voltages comprises a histogram H having a plurality of features.

3. The method of claim 2, wherein the transformation G is applied to the plurality of features of H.

4. The method of claim 2, wherein the transformation G is nonlinear.

5. The method of claim 4, wherein the transformation G comprises at least one of: roots of H, powers of H, natural logarithm of H, and products between the features in H.

6. The method of claim 2, wherein a number of features of G used in the estimation is limited to a predetermined number.

7. The method of claim 2, wherein the features of G selected for use in the estimation is based on hardware or memory cell constraints of the SSD.

8. The method of claim 1, wherein the mock threshold voltages are estimated using an estimator coefficient Y.

9. The method of claim 8, wherein Y is obtained using an iterative weighted least squares algorithm, weights of the least squares algorithm being a function of a bit error rate (BER) added per row.

10. The method of claim 1, wherein the read threshold voltages are estimated using a deep-neural network (DNN).

11. A solid-state drive (SSD) comprising:
a non-volatile semiconductor memory device comprising a plurality of memory cells for storing data, the memory cells arranged in memory blocks comprising rows; and
a controller in communication with the plurality of memory cells, the controller configured to:
retrieve data from a target row of memory cells of the plurality of memory cells associated with a read request received from a host using initial threshold voltages;

decode the data using a hard decision stage;
if the hard decision stage fails:
perform mock reads on the target row of memory cells;
estimate optimal threshold voltages of the target row of memory cells based on a transformation G of a distribution of threshold voltages obtained from the mock reads; and
retrieve data from the target row using the estimated optimal threshold voltages.

12. The SSD of claim 11, wherein the distribution of threshold voltages comprises a histogram H having a plurality of features.

13. The SSD of claim 12, wherein the transformation G is applied to the plurality of features of H.

14. The SSD of claim 12, wherein the transformation G is nonlinear.

15. The SSD of claim 14, wherein the transformation G comprises at least one of: roots of H, powers of H, natural logarithm of H, and products between the features in H.

16. The SSD of claim 12, wherein a number of features of G used in the estimation is limited to a predetermined number.

17. The SSD of claim 12, wherein the features of G selected for use in the estimation is based on hardware or memory cell constraints of the SSD.

18. The SSD of claim 11, wherein the mock threshold voltages are estimated using an estimator coefficient Y.

19. The SSD of claim 18, wherein Y is obtained using an iterative weighted least squares algorithm, the weights being a function of a bit error rate (BER) added per row.

20. The SSD of claim 11, wherein the read threshold voltages are estimated using a deep-neural network (DNN).

* * * * *